United States Patent [19]

Baranyovits et al.

[11] 3,843,655
[45] Oct. 22, 1974

[54] HETEROCYCLIC COMPOUNDS AND COMPOSITIONS

[75] Inventors: Francis Leslie Charles Baranyovits; Ian Trevor Kay, both of Wokingham, England

[73] Assignee: Imperial Chemical Industries Limited, London, England

[22] Filed: Apr. 25, 1972

[21] Appl. No.: 247,353

[30] Foreign Application Priority Data
May 6, 1971 Great Britain..................... 13477/71
Aug. 9, 1971 Great Britain..................... 37298/71
Oct. 5, 1971 Great Britain..................... 46229/71
Dec. 15, 1971 Great Britain..................... 58224/71

[52] U.S. Cl....... 260/256.5 R, 260/256.4 E; 256.4 C, 424/200
[51] Int. Cl............................................ C07d 51/36
[58] Field of Search ............... 260/256.5 R, 256.4 E

[56] References Cited
UNITED STATES PATENTS
3,287,453  11/1966  McHattie ..................... 260/256.4 E FOREIGN PATENTS OR APPLICATIONS
1,129,797  10/1968  Great Britain ............... 260/256.4 E Primary Examiner—R. J. Gallagher
Attorney, Agent, or Firm—Cushman, Darby & Cushman

[57] ABSTRACT

Pesticidal compounds and compositions of formula I, wherein X is O or S; Y & Z, which may be the same or different, are unsubstituted or substituted, hydrocarbyl, hydrocarbyloxy, hydrocarbylthio or amino groups; $R^3$ and $R^4$, which may be the same or different, are H or halogen, or unsubstituted or substituted hydrocarbon groups; $R^1$ is an unsubstituted or substituted hydrocarbon group; and $R^2$ is the acyl residue of a carboxylic or S-containing acid;

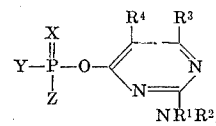

3 Claims, No Drawings

HETEROCYCLIC COMPOUNDS AND COMPOSITIONS

This invention relates to new pyrimidine derivatives which are useful in that they possess pesticidal properties. More particularly it relates to 2-acylaminopyrimidin-4-yl esters of phosphorus-containing acids.

In our prior British Patent No. 1,019,227 we have described and claimed pyrimidine derivatives of the formula:

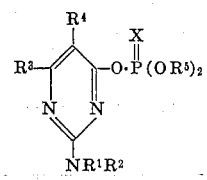

wherein $R^1$, $R^2$ and $R^5$, which may be the same or different, stand for alkyl or alkenyl radicals of not more than 6 carbon atoms, or wherein $R^1$ and $R^2$ together with the adjacent nitrogen atom form a heterocyclic radical; wherein $R^3$ and $R^4$ stand for hydrogen or an alkyl or akenyl radical of not more than 6 carbon atoms; and wherein X stands for the oxygen or sulphur atom.

We have now discovered that introduction of an acylated alkylamino group at the 2-position of the pyrimidine ring results in enhancing the biological activity in certain respects.

Accordingly the present invention provides new pyrimidine derivatives of the formula:

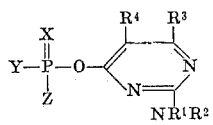

or a salt thereof, wherein X is oxygen or sulphur, Y and Z, which may be the same or different, represent unsubstituted or substituted, hydrocarbyl, hydrocarbyloxy, hydrocarbylthio or amino groups; $R^3$ and $R^4$, which may be the same or different, represent hydrocarbon or halogen atoms or unsubstituted or substituted hydrocarbon groups; $R^1$ represents a substituted or unsubstituted hydrocarbyl group; and $R^2$ represents the acyl residue of a carboxylic or sulphur containing acid.

Preferred compounds are those wherein the hydrocarbyl groups are unsubstituted hydrocarbyl groups.

In a preferred aspect therefore the invention provides compounds of formula:

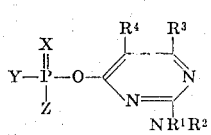

wherein X is oxygen or sulphur; Y and Z, which may be the same or different, are hydrocarbyl, hydrocarbyloxy, or hydrocarbyl-substituted amino groups; $R^3$ and $R^4$, which may be the same or different, represent hydrogen or halogen atoms or hydrocarbyl groups, $R^1$ represents a hydrocarbyl group; and $R^2$ represents the acyl residue of a carboxylic or sulphur-containing acid.

More preferred compounds are those wherein the hydrocarbyl groups are alkyl groups. In a more preferred aspect therefore the invention provides compounds of formula:

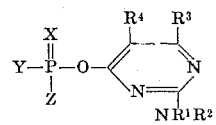

wherein X is oxygen or sulphur; Y and Z, which may be the same or different, are alkyl, alkoxy, or alkyl-substituted amino; $R^3$ and $R^4$, which may be the same or different, are hydrogen or alkyl; $R^1$ is alkyl; and $R^2$ is a group $R^5$.CO- where $R^5$ is hydrogen, alkyl, alkoxy or alkyl-substituted amino.

Yet more preferred compounds are those wherein the alkyl groups each contain up to six carbon atoms.

In an yet more preferred aspect the invention provides compounds of formula:

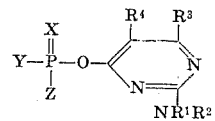

wherein X is oxygen or sulphur; Y and Z, which may be the same or different, are alkyl containing up to six carbon atoms, alkoxy containing up to six carbon atoms, or alkyl-substituted amino containing up to six carbon atoms; $R^3$ and $R^4$ are hydrogen or alkyl containing up to six carbon atoms; $R^1$ is alkyl containing up to six carbon atoms and $R^2$ is a group $R^5$. CO- where $R^5$ is hydrogen, alkyl containing up to six carbon atoms, alkoxy containing up to six carbon atoms, or alkyl-substituted amino containing up to six carbon atoms.

In an especially preferred aspect the invention provides compounds of formula:

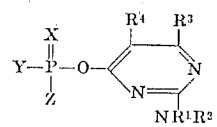

wherein X is oxygen or sulphur; Y and Z, which may be the same or different, are ethyl, methoxy, ethoxy or dimethylamino; R³ and R⁴, which may be the same or different, are hydrogen or methyl; R¹ is alkyl containing up to four carbon atoms; R² is a group R⁵·CO- where R⁵ is hydrogen, alkyl containing up to three carbon atoms, ethoxy or methylamino.

Specific compounds according to the invention are those illustrated in Table I below, which all correspond to the formula:

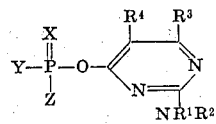

Table I lists the meanings for R¹, R², R³, R⁴, X, Y and Z for each compound, together with a physical characteristic.

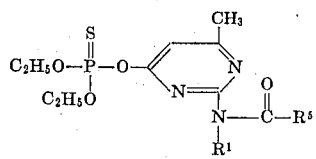

wherein R¹ is alkyl containing up to four carbon atoms, and R⁵ is hydrogen or alkyl containing up to three carbon atoms.

Of this second group of compounds those wherein R¹ is ethyl are most particularly preferred, for example the compounds numbered 3 and 5 in Table I above.

In a further aspect the invention provides a process for the preparation of the invention compounds which comprises reacting a compound of the formula:

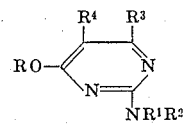

TABLE I

| Compound No. | R¹ | R² | R³ | R⁴ | X | Y | Z | Physical Characteristic |
|---|---|---|---|---|---|---|---|---|
| 1 | C₂H₅ | COC₂H₅ | CH₃ | H | S | OCH₃ | OCH₃ | m.p. 42°C |
| 2 | C₂H₅ | COC₃H₇(n) | CH₃ | H | S | OCH₃ | OCH₃ | $n^{23}_D$ 1.5217 |
| 3 | C₂H₅ | COCH₃ | CH₃ | H | S | OC₂H₅ | OC₂H₅ | $n^{23}_D$ 1.5052 |
| 4 | C₂H₅ | COCH₃ | CH₃ | H | O | OC₂H₅ | OC₂H₅ | $n^{23}_D$ 2.4919 |
| 5 | C₂H₅ | COC₂H₅ | CH₃ | H | S | OC₂H₅ | OC₂H₅ | m.p. 41–42°C |
| 6 | C₂H₅ | COC₂H₅ | CH₃ | H | O | OC₂H₅ | OC₂H₅ | $n^{23}_D$ 1.4920 |
| 7 | C₂H₅ | COCH₃ | CH₃ | H | S | OCH₃ | OCH₃ | m.p. 38°C |
| 8 | C₂H₅ | CO₂C₂H₅ | CH₃ | H | S | OCH₃ | OCH₃ | $n^{23}_D$ 1.5126 |
| 9 | C₂H₅ | CO₂C₂H₅ | CH₃ | H | S | OC₂H₅ | OC₂H₅ | $n^{23}_D$ 1.5059 |
| 10 | C₂H₅ | COCH(CH₃)₂ | CH₃ | H | S | OCH₃ | OCH₃ | $n^{23}_D$ 1.5189 |
| 11 | C₂H₅ | COCH(CH₃) | CH₃ | H | S | OC₂H₅ | OC₂H₅ | $n^{23}_D$ 1.5071 |
| 12 | C₂H₅ | COC₃H₇(n) | CH₃ | H | S | OC₂H₅ | OC₂H₅ | $n^{21}_D$ 1.5130 |
| 13 | CH₃ | COCH₃ | CH₃ | H | S | OCH₃ | OCH₃ | m.p. 34°C |
| 14 | CH₃ | COCH₃ | CH₃ | H | S | OC₂H₅ | OC₂H₅ | $n^{21}_D$ 1.5256 |
| 15 | CH₃ | COC₂H₅ | CH₃ | H | S | OCH₃ | OCH₃ | m.p. 36–37°C |
| 16 | CH₃ | COC₂H₅ | CH₃ | H | S | OC₂H₅ | OC₂H₅ | m.p. 33–33.5°C |
| 17 | CH₃ | COC₃H₇(n) | CH₃ | H | S | OCH₃ | OCH₃ | $n^{21}_D$ 1.5289 |
| 18 | CH₃ | COC₃H₇(n) | CH₃ | H | S | OC₂H₅ | OC₂H₅ | $n^{21}_D$ 1.5172 |
| 19 | C₂H₅ | CHO | CH₃ | H | S | OCH₃ | OCH₃ | m.p. 38.5–39.5°C |
| 20 | CH₃ | CHO | CH₃ | H | S | OCH₃ | OCH₃ | m.p. 30°C |
| 21 | CH₃ | CHO | CH₃ | H | S | OC₂H₅ | OC₂H₅ | m.p. 54.5–55°C |
| 22 | C₂H₅ | COCH₃ | CH₃ | CH₃ | S | OCH₃ | OCH₃ | m.p. 66–68°C |
| 23 | C₂H₅ | COCH₃ | CH₃ | CH₃ | S | OC₂H₅ | OC₂H₅ | m.p. 37–38°C |
| 24 | C₃H₇(n) | COCH₃ | CH₃ | H | S | OC₂H₅ | OC₂H₅ | $n^{26}_D$ 1.5141 |
| 25 | C₂H₅ | CHO | CH₃ | H | S | OC₂H₅ | OC₂H₅ | m.p. 31.5–32.5°C |
| 26 | C₂H₅ | COCH₃ | CH₃ | H | O | N(CH₃)₂ | OC₂H₅ | $n^{22.5}_D$ 1.5041 |
| 27 | C₂H₅ | COCH₃ | CH₃ | H | S | OC₂H₅ | C₂H₅ | $n^{21.5}_D$ 1.5150 |
| 28 | C₂H₅ | CONHCH₃ | CH₃ | H= | S | OC₂H₅ | OC₂H₅ | m.p. 80°C |
| 29 | C₄H₉(n) | COCH₃ | CH₃ | H | S | OC₂H₅ | OC₂H₅ | $n^{23}_D$ 1.5129 |

Of the compounds set out in Table I above two groups are particularly useful in combatting insect and fungal pests. The first group consists of compounds of formula:

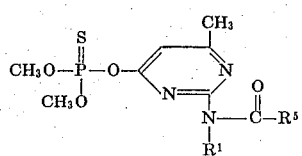

Wherein R¹ is alkyl containing up to four carbon atoms, and R⁵ is hydrogen or alkyl containing up to three carbon atoms; and the second group consists of compounds of formula:

wherein R¹, R², R³ and R⁴ have any of the meanings given to them hereinbefore and R is a hydrogen atom or an alkali metal atom, with a halophosphorus compound of formula:

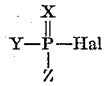

wherein X, Y and Z have any of the meanings given to them hereinbefore and Hal is a halogen atom.

When R is an alkali metal atom it is preferably a sodium or potassium atom. Preferably Hal is a chlorine or bromine atom.

In the case where R is hydrogen, the starting compound is conveniently first converted to the corresponding alkali metal derivative, for example by reaction with a solution of sodium in ethanol. Alternately the reaction may be carried out in the presence of an acid-binding agent, for example an alkali metal salt of a weak acid, for example an alkali metal carbonate, for example potassium carbonate, or a tertiary organic base, for example a trialkylamine of not more than 12 carbon atoms, for example an N,N-dialkylarylamine of not more than 12 carbon atoms, for example N,N-dimethylaniline.

The reaction may conveniently be carried out in a diluent or solvent which does not react with the other components present, for example benzene, and it may be accelerated or completed by the application of heat.

The 2-acylamino-4-hydroxy pyrimidines which are used in the above processes are prepared by the acylation of the correspondingly substituted 2-amino-hydroxypyrimidines. Acid anhydrides are suitable acylating agents for this purpose, but other acylating agents, e.g. acid chlorides or ketenes, may also be used. Many of the 2-acylamino-4-hydroxy pyrimidines used are new compounds.

Examples of 2-acylamino-4-hydroxy pyrimidines used as intermediates for the preparation of the invention compounds are given in the Table below; they correspond to the formula:

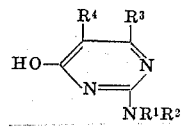

The values for $R^1R^2$, $R^3$ and $R^4$ are given for each compound together with a physical characteristic.

invention compounds involves treating a compound of the formula:

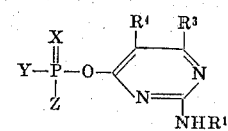

with an acylating agent, for example an acid halide of formula $R^2$Hal (where Hal represents a halogen atom) or an acid anhydride of formula $R^2$—O—$R^6$, where $R^6$ may be the same, or a different, acyl residue of a carboxylic or sulphur-containing acid as $R^2$.

In this specification the term "acid anhydride" is intended to include within its scope all molecules that are practically or theoretically derived by the abstraction of the elements of water from one or more molecules of the acid, and includes inter alia isocyanates and isothiocyanates.

The pyrimidine derivatives of the invention possess useful pesticidal properties and in particular, are useful insecticides, molluscicides and fungicides.

Thus the compounds of the invention are toxic towards a wide variety of insect and other invertebrate pests including for example the following:

*Tetranychus telarius*  *Musca domestica*
*Aphis fabae*  *Pieris brassicae*
*Megoura viceae*  *Plutella maculipennis*
*Aedes aegypti*  *Phaedon cochleariae*
*Calandra granaria*  *Tribolium confusum*
*Blattella germanica*  *Meloidogyne incognita*
*Agriolimax reticulatus*

The compounds of the present invention are also effective fungicides, and are particularly useful in combatting the plant diseases *Uncinula necator* and *Podosphaera leucotricha*.

TABLE 2

| Intermediate No. | $R^1$ | $R^2$ | $R^3$ | $R^4$ | Melting Point |
|---|---|---|---|---|---|
| 1.1 | CH$_3$ | CHO | CH$_3$ | H | 188°C (dec) |
| 1.2 | CH$_3$ | COCH$_3$ | CH$_3$ | H | 130°C |
| 1.3 | CH$_3$ | COC$_2$H$_5$ | CH$_3$ | H | 118°C |
| 1.4 | CH$_3$ | COC$_3$H$_7$(n) | CH$_3$ | H | 111°C |
| 1.5 | CH$_3$ | COCH$_3$ | CH$_3$ | CH$_3$ | 102°C |
| 1.6 | C$_2$H$_5$ | CHO | CH$_3$ | H | 162°C |
| 1.7 | C$_2$H$_5$ | COCH$_3$ | CH$_3$ | H | 110°C |
| 1.8 | C$_2$H$_5$ | COC$_2$H$_5$ | CH$_3$ | H | 80–81°C |
| 1.9 | C$_2$H$_5$ | COC$_3$H$_7$(n) | CH$_3$ | H | 80–83°C |
| 1.10 | C$_2$H$_5$ | COCH(CH$_3$)$_2$ | CH$_3$ | H | 70°C |
| 1.11 | C$_2$H$_5$ | CONHCH$_3$ | CH$_3$ | H | 157–159°C |
| 1.12 | C$_2$H$_5$ | COOC$_2$H$_5$ | CH$_3$ | H | 77°C |
| 1.13 | C$_3$H$_7$(n) | COCH$_3$ | CH$_3$ | H | 106°C |
| 1.14 | C$_4$H$_9$(n) | COCH$_3$ | CH$_3$ | H | 77–79°C |

Examples of halophosphorus compounds which may be used in the preparation of the compounds of the invention include Dimethylphosphorochloridothionate
Diethylphosphorochloridate
Diethylphosphorochloridothionate
Diethylphosphonochloridothionate
and
N,N-Dimethyl-O-ethylphosphoramidochloridate.

An alternative procedure for the preparation of the

The compounds of the invention may be used to combat pests on their own but are more conveniently used in the form of a composition, which comprises a diluent or carrier material in addition to an invention compound as hereinbefore defined.

In a further aspect therefore the invention provides a pesticidal composition comprising as an active ingredient a compound of formula:

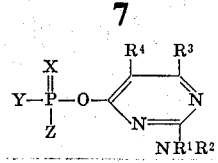

or an acid-addition salt thereof, wherein X is oxygen or sulphur; Y and Z, which may be the same or different, represent unsubstituted or substituted, hydrocarbyl, hydrocarbyloxy, hydrocarbylthio, or amino groups; $R^3$ and $R^4$, which may be the same or different, represent hydrogen or halogen atoms or unsubstituted or substituted hydrocarbyl groups; $R^1$ represents an unsubstituted or substituted hydrocarbyl group; and $R_2$ represents the acyl residue of a carboxylic or sulphur-containing acid; and also comprising a diluent or carrier.

Preferred active ingredients are those wherein the hydrocarbyl groups are unsubstituted hydrocarbyl groups.

In a preferred aspect therefore the invention provides a pesticidal composition comprising as an active ingredient a compound of formula:

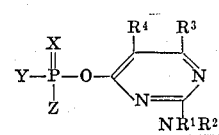

wherein X is oxygen or sulphur; Y and Z, which may be same or different, are hydrocarbyl, hydrocarbyloxy, or hydrocarbyl-substituted amino groups; $R^3$ and $R^4$, which may be the same or different, represent hydrogen or halogen atoms or hydrocarbyl groups, $R^1$ represents a hydrocarbyl groups; and $R^2$ represents the acyl residue of a carboxylic or sulphur-containing acid.

More preferred active ingredients are those wherein the hydrocarbyl groups are alkyl groups.

In a more preferred aspect therefore the invention provides a pesticidal composition comprising as an active ingredient a compound of formula:

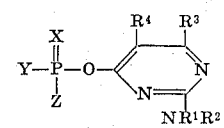

wherein X is oxygen or sulphur; Y and Z, which may be the same or different, are alkyl, alkoxy, or alkyl-substituted amino; $R^3$ and $R^4$, which may be the same or different, are hydrogen or alkyl; $R^1$ is alkyl; and $R^2$ is a group $R^5$.CO— where $R^5$ is hydrogen, alkyl, alkoxy, or alkyl-substituted amino.

Yet more preferred active ingredients are those wherein the alkyl groups each contain up to six carbon atoms.

In a yet more preferred aspect therefore the invention provides a pesticidal composition comprising as an active ingredient a compound of the formula:

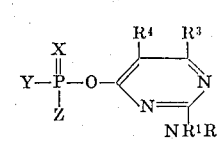

wherein X is oxygen or sulphur; Y and Z, which may be the same or different, are alkyl containing up to six carbon atoms, alkoxy containing up to six carbon atoms, or alkyl-substituted amino containing up to six carbon atoms; $R^3$ and $R^4$ are hydrogen or alkyl containing up to six carbon atoms; $R^1$ is alkyl containing up to six carbon atoms and $R^2$ is a group $R^5$.CO— where $R^5$ is hydrogen, alkyl containing up to six carbon atoms, alkoxy containing up to six carbon atoms, or alkyl-substituted amino containing up to six carbon atoms.

In an especially preferred aspect the invention provides a pesticidal composition comprising as an active ingredient a compound of formula:

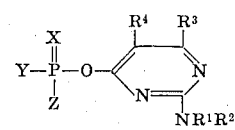

wherein X is oxygen or sulphur; Y and Z, which may be the same or different, are ethyl, methoxy, ethoxy or dimethylamino; $R^3$ and $R^4$, which may be the same or different, are hydrogen or methyl; $R^1$ is alkyl containing up to four carbon atoms; $R^2$ is a group $R^5$.CO— where $R^5$ is hydrogen, alkyl containing up to three carbon atoms, ethoxy or methylamino.

Particularly useful pesticidal compositions are those which comprise as an active ingredient either a compound of formula:

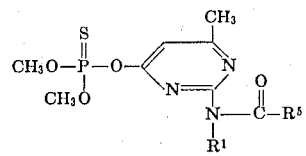

wherein $R^1$ is alkyl containing up to four carbon atoms, and $R^5$ is hydrogen or alkyl containing up to three carbon atoms; or a compound of formula:

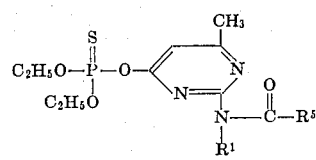

wherein $R^1$ is alkyl containing up to four carbon atoms, and $R^5$ is hydrogen or alkyl containing up to three carbon atoms.

Of the pesticidal compositions comprising as active ingredients the last mentioned group of compounds, those comprising compounds wherein $R^1$ is ethyl are most particularly preferred, for example those comprising the compound numbered 3 or the compound numbered 5 in Table I above.

The compositions may be used for agricultural or horticultural purposes and the type of composition used in any instance will depend upon the particular purpose for which it is to be used.

The compositions may be in the form of dusting powders wherein the active ingredient is mixed with a solid diluent or carrier. Suitable solid diluents or carriers may be, for example, kaolin, bentonite, kieselguhr dolomite, calcium carbonate, talc, powdered magnesium, Fuller's earth, gypsum, Hewitt's earth, diatomaceous earth and china clay.

The compositions may also be in the form of liquid preparations to be used as dips or sprays which are generally aqueous dispersion of emulsions containing the active ingredient in the presence of one or more wetting agents, dispersing agents, emulsifying agents or suspending agents.

Wetting agents, dispersing agents and emulsifying agents may be of the cationic, anion or non-ionic type. Suitable agents of the cationic type include, for example, quaternary ammonium compounds, for example, cetyltrimethylammonium bromide. Suitable agents of the anionic type include, for example, soaps, salts of aliphatic mono-esters of sulphuric acid for example sodium lauryl sulphate, salts of sulphonated aromatic compounds, for example sodium dodecylbenzenesulphonate, sodium, calcium or ammonium lignosulphonate, butylnaphthalene sulphonate, and a mixture of the sodium salts of diisopropyl- and triisopropyl-naphthalene sulphone acids. Suitable agents of the non-ionic type include, for example, the condensation products of ethylene oxide with fatty alcohols such as oleyl alcohol or cetyl alcohol or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives for example for improving the distribution, adhesive power and resistance to rain on treated surfaces. The different compositions can be better adapted for the various uses for which they are intended.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may contain 10–85 percent by weight of the active ingredient or ingredients. When diluted to form aqueous preparations, such preparations may contain varying amounts of the active ingredient or ingredients depending upon the purpose for which they are to be used.

For agricultural or horticultural purposes, an aqueos preparation containing between 0.0001 and 0.1 percent by weight of the active ingredient or ingredients may be used.

The compositions of the present invention may, if desired, also comprise in addition to a compound of the present invention, at least one other biologicallyactive ingredient, for example, an insecticide, or a fungicide.

Thus, for example, a composition of the present invention may comprise a compound of the present invention together with the gamma isomer of 1,2,3,4,5,6-hexachlorocyclohexane.

The compounds and compositions of the invention may be used for agricultural or horticultural purposes and the compound or type of composition used in any instance will depend upon the particular purpose for which it is to be used.

In use, the invention compounds or compositions may be used to combat pests in a variety of ways. Thus the pests themselves, or the locus of the pests or the pest habitat may be treated to control the pests.

In a further feature therefore the invention provides a method of combating pests wherein the pests, the locus of the pests, or the habitat of the pests is treated with a compound or a composition according to the invention.

The invention also provides a method of treating plants with a compound or composition according to the invention to render them less susceptible to damage by pests, which may already be occurring (i.e. treatment to eradicate an infestation or infection) or which is expected to occur (i.e. treatment to protect the plant from an infestation or infection).

In a yet further feature, therefore, the invention provides a method of treating plants to render them less susceptible to damage by pests, which comprises treating the plants, or the seeds, corms, bulbs, tubers, rhizomes or other propagative parts of the plants, with a compound or composition according to the invention.

If desired the medium in which the plants are growing may be similarly treated with a compound or composition according to the invention.

In another feature, therefore the invention provides a method of treating a medium in which plants are growing or to be grown which comprises applying to the medium a compound or composition according to the invention.

The invention is illustrated, but not limited, by the following examples.

EXAMPLE 1

This example illustrates the preparation of 2-N-ethyl-formamido-4-hydroxy-6-methylpyrimidine (intermediate No.I.6, Table 2) having the formula:

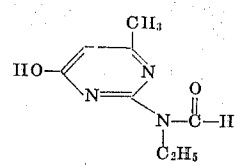

2-Ethylamino-4-hydroxy-6-methylpyrimidine (39.0 g) was dissolved with gentle warming in formic acid solution (98 percent w/v; 50 ml.) and the solution warmed to 60°C. Acetic anhydride (120 ml) was added to the solution at a rate so that the temperature was maintained in the range 60°–65°C, after which the mixture was kept at 60°C for a further 3 hours. The mixture was then kept at the ambient temperature for 18 hours, after which the volatile components were removed by evaporation under reduced pressure. The residual solid was recrystallised from a mixture of chloroform (1 part by volume) and petroleum ether (boiling range 40°–60°C; 3 parts by volume) to yield white crystals of 2-N-ethylforamido-4-hydroxy-6-methyl-pyrimidine, melting at 162°C.

EXAMPLE 2

By a procedure similar to that illustrated in Example 1 above 2-N-methylformamido-4-hydroxy-6-methylpyrimidine (intermediate No.I.1) was prepared from 2-N-methylamino-4-hydroxy-6-methylpyrimidine.

EXAMPLE 3

This example illustrates the preparation of 2-N-ethylacetamido-4-hydroxy-6-methylpyrimidine (intermediate No.I.7, Table 2) having the formula:

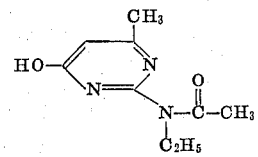

2-N-Ethylamino-4-hydroxy-6-methylpyrimidine (4.6 g) was added to acetic anhydride (5.0 ml.) and the mixture heated at 100°C for 3 hours. After cooling to the ambient temperature the mixture was treated with water (100 ml) and neutralised with sodium bicarbonate solution (saturated). The resulting slurry was extracted with chloroform (3 × 50 ml.) and the extracts dried over anhydrous sodium sulphate, and evaporated to yield a white crystalline residue which was recrystallised from chloroform to yield white crystals of 2-N-ethylacetamido-4-hydroxy-6-methyl pyrimidine, having a melting point of 108°C.

EXAMPLE 4

By a procedure similar to that illustrated in Example 3 above other intermediate compounds were prepared from the appropriate reactants as follows:
2-N-methylacetamido-4-hydroxy-6-methylpyrimidine (intermediate No. I.2, Table 2) from 2-methylamino-4-hydroxy-6-methylpyrimidine and acetic anhydride;
2-N-methylpropionamido-4-hydroxy-6-methylpyrimidine (intermediate No. I.3, Table 2) from 2-methylamino-4-hydroxy-6-methylpyrimidine and propionic anhydride;
2-N-methyl-n-butyramido-4-hydroxy-6-methylpyrimidine (intermediate No. I.4, Table 2) from 2-methylamino-4-hydroxy-6-methylpyrimidine and n-butyric anhydride.
2-N-ethylacetamido-4,5-dimethyl-6-hydroxypyrimidine (intermediate No. I.5, Table 2) from 2-ethylamino-4,5-dimethyl-6-hydroxy pyrimidine and acetic anhydride;
2-N-ethylpropionamido-4-hydroxy-6-methylpyrimidine (intermediate No. I.8, Table 2) from 2-ethylamino-4-hydroxy-6-methylpyrimidine and propionic anhydride;
2-N-ethyl-n-butyramido-4-hydroxy-6-methylpyrimidine (intermediate No. I.9, Table 2) from 2-ethylamino-4-hydroxy-6-methyl pyrimidine and n-butyric anhydride;
2-N-ethyl-iso-butyramido-4-hydroxy-6-methylpyrimidine (intermediate No. I.10, Table 2) from 2-ethylamino-4-hydroxy-6-methylpyrimidine and iso-butyric anhydride;
2-N-ethyl-N-ethoxycarbonylamino-4-hydroxy-6-methylpyrimidine (intermediated No. I.12, Table 2) from 2-ethylamino-4-hydroxy-6-methylpyrimidine and diethylpyrocarbonate; 2-N-n-propylacetamido-4-hydroxy-6-methylpyrimidine (intermediate No. I.13, Table 2) from 2-n-propylamino-4-hydroxy-6-methylpyrimidine and acetic anhydride; and
2-N-n-butylacetamido-4-hydroxy-6-methylpyrimidine (intermediate No. I.14, Table 2) from 2-n-butylamino-4-hydroxy-6-methyl-pyrimidine and acetic anhydride.

EXAMPLE 5

This example illustrates the preparation of N-ethyl-N'-methyl-N-4-hydroxy-6-methylpyrimidin-2-yl urea (Compound No. I. 11, Table 2) having the formula:

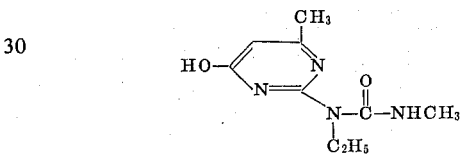

2-Ethylamino-4-hydroxy-6-methylpyrimidine (10.0 g) was dissolved in boiling toluene (150 ml.) and to this boiling solution was added dropwise methyl isocyanate (6.0 g) after which the mixture was refluxed for 30 minutes. A further quantity of methyl isocyanate (3.6 g) was then added and the mixture refluxed for a further 45 minutes. After filtering whilst hot, the filtrate was cooled to 0°C and kept at this temperature for 16 hours. The precipitated crystals were collected by filtration and recrystallised from ethanol to yield white crystals of N-ethyl-N'-methyl-N-4-hydroxy-6-methylpyrimidin-2-yl urea, melting at 157°–159°C.

EXAMPLE 6

This example illustrates the preparation of 0,0-dimethyl 0(2-N-ethylacetamido-4-methylpyrimidin-6-yl) phosphorothionate (Compound No. 7 of Table I) having the formula:

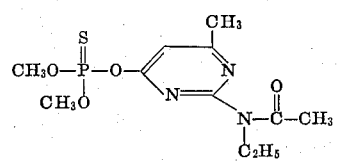

To a stirred suspension of 2-N-ethylacetamido-4-hydroxy-6-methylpyrimidine (5.8 g) and finely ground anhydrous potassium carbonate (8.4 g) in dry acetone (75 cc) was added dimethyl-phosphorochloridothionate (4.8 g) dropwise, the rate just being sufficient to maintain the reaction temperature at 25°C. After addition was completed the reaction mixture was stirred at the ambient temperature for 48 hours, after which the mixture was filtered, the filtrate evaporated under reduced pressure at a temperature less than 25°C, to yield a pale yellow residual oil. This was dissolved in methylene chloride and washed with 5 percent aqueous sulphuric acid solution (9 × 50 cc) and then with water (5 × 100 cc). After drying the organic phase over anhydrous magnesium sulphate, and filtering, the filtrate was evaporated to yield an oil which was just dissolved in a diethyl ether/petroleum ether mixture.

Cooling and scratching yielded white crystals of 0,0-dimethyl 0(2-N-ethylacetamido-4-methylpyrimidin-6-yl) phosphorothionate, having a melting point of 38°C.

EXAMPLE 7

The preparation of other compounds of the invention was achieved using a procedure similar to that illustrated in Example 6 above, but using the appropriate reactants as follows:

0,0-dimethyl 0(2-N-ethylpropionamido-4-methylpyrimidin-6-yl) phosphorothionate (Compound No. 1, Table I) from intermediate No. I.8 (Table 2) and dimethylphosphorochloridothionate;

0,0-dimethyl 0(2-N-ethyl-n-butyramido-4-methylpyrimidin-6-yl) phosphorothionate (Compound No. 2, Table I) intermediate No. I.9 (Table 2) and dimethylphosphorochloridothionate;

0,0-diethyl 0(2-N-ethylacetamido-4-methylpyrimidin-6-yl) phosphorothionate (Compound No.3, Table I) from intermediate No. I.7 (Table 2) and diethylphosphorochloridothionate;

0,0-diethyl 0(2-N-ethylacetamido-4-methylpyrimidin-6-yl) phosphate (Compound No.4, Table I) from intermediate No.I.7 (Table 2) and diethylphosphorochloridate;

0,0-diethyl 0(2-N-ethylpropionamido-4-methylpyrimidin-6-yl) phosphorothionate (Compound No.5, Table I) from intermediate No. I.8 (Table 2) and diethylphosphorochloridothionate;

0,0-diethyl 0(2-N-ethylpropionamido-4-methylpyrimidin-6-yl) phosphate (Compound No.6, Table I) from intermediate No. I.8 (Table 2) and diethylphosphorochloridate;

0,0-dimethyl 0(2-N-ethyl-N-ethoxycarbonylamino-4-methylpyrimidin-6-yl) phosphorothionate (Compound No.8, Table I) from intermediate No. I.12 (Table 2) and dimethylphosphorochloridothionate;

0,0-diethyl 0(2-N-ethyl-N-ethoxycarbonylamino-4-methylpyrimidin-6-yl) phosphorothionate (Compound No.9, Table I) from intermediate No. I.12 (Table 2) and diethylphosphorochloridothionate;

0,0-dimethyl 0(2-N-ethyl-iso-butyramido-4-methylpyrimidin-6-yl)phosphorothionate (Compound No. 10 Table I) from intermediate No. I.10 (Table 2) and dimethylphosphorochloridothionate;

0,0-diethyl 0(2-N-ethyl-iso-butyramido-4-methylpyrimidin-6-yl) phosphorothionate (Compound No.11, Table I) from intermediate No. I.10 (Table 2) and diethylphosphorochloridothionate;

0,0-dimethyl 0(2-N-ethyl-n-butyramido-4-methylpyrimidin-6-yl) phosphorothionate (Compound No.12, Table I) from intermediate No. I.9 (Table 2) and diethylphosphorochloridothionate;

0,0-dimethyl 0(2-N-methylacetamido-4-methylpyrimidin-6-yl) phosphorothionate (Compound No.13, Table I) from intermediate No. I.2 (Table 2) and dimethylphosphorochloridothionate;

0,0-diethyl 0(2-N-methylacetamido-4-methylpyrimidin-6-yl) phosphorothionate (Compound No.14, Table I) from intermediate No. I.2(Table 2) and diethylphosphorochloridothionate;

0,0-dimethyl 0(2-N-methylpropionamido-4-methylpyrimidin-6-yl) phosphorothionate (Compound No.15, Table I) from intermediate No.I.3 (Table 2) and dimethylphosphorochloridothionate;

0,0-diethyl 0(2-N-methylpropionamido-4-methylpyrimidin-6-yl) phosphorothionate (Compound No. 16, Table I) from intermediate No. I.3 (Table 2) and diethylphosphorochloridothionate;

0,0-dimethyl 0(2-N-methyl-n-butyramido-4-methylpyrimidin-6-yl) phosphorothionate (Compound No.17, Table I) from intermediate No. I.4 (Table 2) and dimethylphosphorochloridothionate;

0,0-diethyl 0(2-N-methyl-n-butyramide-4-methylpyrimidin-6-yl)phosphorothionate (Compound No. 18, Table I) from intermediate No. I.4 (Table 2) and diethylphosphorochloridothionate;

0,0-dimethyl 2-N-ethylformamido-(21 -N-ethylformmamido-4-methylpyrimidin-6-yl) phosphorothionate (Compound No. 19, Table I) from intermediate No. I.6 (Table 2) and dimethylphosphorochloridothionate.

0,0-dimethyl 0(2-N-methylformamido-4-methylpyrimidin-6-yl) phosphorothionate (Compound No.20, Table I) from intermediate No. I.1 (Table 2) and dimethylphosphorochloridothionate;

0,0-diethyl 0(2-N-methylformamido-4-methylpyrimidin-6-yl) phosphorothionate (Compound No. 21, Table I) from intermediate No. I.1 (Table 2) and diethylphosphorochloridothionate;

0,0-dimethyl 0(2-N-ethylacetamido-4,5-dimethylpyrimidin-6-yl) phosphorothionate (Compound No.22, Table I) from intermediate No. I.5 (Table 2) and dimethylphosphorochloridothionate;

0,0-diethyl 0(2-N-ethylacetamido-4,5-dimethylpyrimidin-6-yl) phosphorothionate (Compound No.23, Table I) from intermediate No. I.5 (Table 2) and diethylphosphorochloridothionate;

0,0-diethyl 0(2-N-n-propylacetamido-4-methylpyrimidin-6-yl) phosphorothionate (Compound No. 24, Table I) from intermediate No. I.13 (Table 2) and diethylphosphorochloridothionate;

0,0-diethyl 0(2-N-ethylformamido-4-methylpyrimidin-6-yl) phosphorothionate (Compound No.25, Table I) from intermediate No. I.6 (Table 2) and diethylphosphorochloridothionate;

0-ethyl N,N-dimethyl 0(2-N-ethylacetamido-4-methylpyrimidin-6-yl) phosphoramidate (Compound No. 26, Table I) from intermediate No. I.7 (Table 2) and N,N-dimethyl-0-ethylphosphoroamidochloridate;

0-ethyl 0(2-N-ethylacetamido-4-methylpyrimidin-6-yl) ethylphosphonothionate (Compound No.27, Table I) from intermediate No. I.7 (Table 2) and diethylphosphonochloridothionate;

0,0-diethyl 0(2-N-ethyl-N-methylcarbamoylamino-4-methylpyrimidin-6-yl) phosphorothionate (Compound No.28, Table I) from intermediate No. I.11 (Table 2) and diethylphosphorochloridothionate;

0,0-diethyl 0(2-N-n-butylacetamido-4-methylpyrimidin-6-yl)phosphorothionate (Compound No.29, Table I) from intermediate No. I.14 (Table 2) and diethylphosphorochloridothionate.

EXAMPLE 8

The activity of a number of the compounds was tested against a variety of insect and other invertebrate pests. The compounds were used in the form of a liquid preparation containing 0.1 percent by weight of the compound except in the tests with *Aedes aegypti* where the preparations contained 0.01 percent by weight of the compound. The preparations were made by dissolving each of the compounds in a mixture of solvents consisting of 4 parts by volume of acetone and 1 part by volume of diacetone alcohol. The solutions were then diluted with water containing 0.01 percent by weight of a wetting agent sold under the trade name "LISSAPOL" NX until the liquid preparations contained the required concentration of the compound. "Lissapol" is a Trade Mark.

The test procedure adopted with regard to each pests was basically the same and comprised supporting a number of the pests on a medium which was usually a host plant or a foodstuff on which the pests feed, and treating either or both the pests and the medium with the preparations.

The mortality of the pests was then assessed at periods usually varying from one to three days after the treatment.

The results of the tests are given below in Table 3. In this table the first column indicates the name of the pest species. Each of the subsequent columns indicates the host plant or medium on which it was supported, the number of days which were allowed to elapse after the treatment before assessing the mortality of the pests, and the results obtained for each of the compounds, numbered as in Table I above. The assessment is expressed in integers which range from 0–3:

0 represents less than 30 percent kill
1 represents 30–49 percent kill
2 represents 50–90 percent kill
3 represents over 90 percent kill A dash (-) in Table 3 indicates that no test was carried out.

TABLE 3

| Pest Species | Support Medium | No. of days | Compound No. (Table I) | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| *Tetranychus telarius* (red spider mites, adults) | French Bean | 3 | 3 | 3 | 3 | 3 | 3 | 3 | 3 | 0 | 3 | 3 | 3 | 3 | 3 | 3 | 3 |
| *Tetranychus telarius* (red spider mites, eggs) | French Bean | 3 | — | — | — | — | — | — | 3 | — | — | — | — | — | — | — | — |
| *Aphis fabae* (green aphids) | Broad Bean | 2 | 3 | 3 | 3 | 3 | 3 | 3 | 3 | 3 | 3 | 3 | 3 | 3 | 3 | 3 | 3 |
| *Megoura viceae* (black aphids) | Broad Bean | 2 | 3 | 3 | 3 | 3 | 3 | 3 | 3 | 3 | 3 | 3 | 3 | 3 | 3 | 3 | 3 |
| *Aedes aegypti* (mosquito adults) | Plywood | 1 | 2 | 2 | 2 | 0 | 3 | 0 | 3 | 0 | 0 | 0 | 0 | 0 | 3 | 3 | 3 |
| *Musca domestica* (houseflies - contact test*) | Milk/Sugar | 2 | 3 | 3 | 3 | 3 | 3 | 3 | 3 | — | — | — | — | 3 | 3 | 3 | 3 |
| *Musca domestica* (houseflies - residual test*) | Plywood | 2 | 0 | 0 | 1 | 3 | 3 | 2 | 3 | — | — | — | — | 3 | 3 | 3 | 2 |
| *Pieris brassicae* (cabbage white caterpillars) (systemic test) | Cabbage | 2 | 0 | 0 | — | — | — | — | 0 | 2 | 3 | 0 | 0 | 0 | 1 | 3 | 3 |
| *Pieris brassicae* (cabbage white caterpillars) (contact test) | Cabbage | 2 | 3 | 3 | 3 | 3 | 3 | 3 | 3 | 3 | 3 | 3 | 3 | 3 | 3 | 3 | 3 |
| *Plutella maculipennis* (diamond back moth, larvae) systemic test | Mustard | 2 | 0 | — | — | — | — | — | 0 | 0 | 3 | 0 | 0 | 0 | 0 | 3 | 0 |
| *Plutella maculipennis* (diamond back moth, larvae) contact test | Mustard | 2 | 2 | 0 | 3 | 0 | 3 | 3 | 3 | 3 | 2 | 3 | 3 | 3 | 3 | 3 | 3 |
| *Phaedon cochleariae* (mustard beetles - residual test) | Mustard | 2 | 3 | 3 | 3 | 3 | 3 | 3 | 3 | 3 | 3 | 2 | 3 | 3 | 2 | 3 | 2 |
| *Phaedon cochleariae* (mustard beetles - systemic test) | Mustard | 2 | 0 | 0 | — | — | — | — | 0 | 1 | 3 | 3 | 0 | — | 0 | 0 | — |
| *Calandra granaria* (grain beetles) | Grain | 2 | 3 | 3 | 3 | 3 | 3 | 3 | 3 | 3 | 3 | 3 | 3 | 2 | 3 | 3 | 3 |
| *Tribolium confusum* (flour beetles) | Grain | 2 | 3 | 3 | 3 | 3 | 3 | 3 | 3 | 3 | 3 | 0 | 3 | 3 | 3 | 3 | 3 |
| *Blattella germanica* (cockroaches) | — | 1 | 3 | 2 | 3 | 3 | 3 | 3 | 3 | 3 | 3 | 3 | 3 | 3 | 3 | 3 | 3 |
| *Meloidogyne incognita* (nematodes) | Water | 1 | — | — | 3 | — | — | — | — | — | — | — | — | — | — | — | — |
| *Aedes aegypti* (mosquito larvae) | Water | 1 | — | — | 3 | — | — | — | — | — | — | — | — | 3 | 3 | 3 | 3 |
| *Tetranychus telarius* (red spider mites, adults) | French Bean | 3 | 3 | 3 | 3 | 3 | 3 | 3 | 3 | 0 | 3 | 3 | 3 | 3 | 3 | 3 | |
| *Tetranychus telarius* (red spider mites, eggs) | French Bean | 3 | — | — | — | — | — | — | 0 | 0 | — | 3 | 0 | 3 | 3 | 3 | |
| *Aphis fabae* (green aphids) | Broad Bean | 2 | 3 | 3 | 3 | 3 | 3 | 3 | 3 | 3 | 3 | 3 | 3 | 3 | 3 | 3 | |
| *Megoura viceae* (black aphids) | Broad Bean | 2 | 3 | 3 | 3 | 3 | 3 | 3 | 3 | 3 | 3 | 3 | 3 | 3 | 3 | 3 | |
| *Aedes aegypti* (mosquito adults) | Plywood | 1 | 3 | 1 | 2 | 0 | 3 | 3 | 0 | 2 | 3 | 3 | 0 | 3 | 0 | 3 | |
| *Musca domestica* (houseflies - contact test*) | Milk/Sugar | 2 | 3 | 3 | 3 | 3 | 3 | 3 | 3 | 3 | 3 | 3 | 3 | 3 | 3 | 3 | |
| *Musca domestica* (houseflies - residual test*) | Plywood | 2 | 3 | 3 | 3 | 1 | 2 | 1 | 0 | 2 | 3 | 2 | 0 | 3 | 2 | 3 | |
| *Pieris brassicae* (cabbage white caterpillars) systemic test | Cabbage | 2 | 3 | 0 | 3 | 2 | — | 2 | 0 | 3 | — | 0 | 0 | 3 | 0 | 0 | |
| *Pieris brassicae* (cabbage white caterpillars) contact test | Cabbage | 2 | 3 | 3 | 3 | 3 | 3 | 3 | 3 | 3 | 3 | — | 0 | — | — | 3 | |
| *Plutella maculipennis* (diamond back moth, larvae) - systemic test | Mustard | 2 | 3 | 0 | 0 | 0 | — | 0 | 0 | 0 | — | 0 | 0 | 3 | 0 | 0 | |

TABLE 3—Continued

| Pest Species | Support Medium | No. of days | \multicolumn{15}{c}{Compound No. (Table 1)} |
| --- | --- | --- | --- | --- | --- | --- | --- | --- | --- | --- | --- | --- | --- | --- | --- | --- | --- |
| | | | 1 | 2 | 3 | 4 | 5 | 6 | 7 | 8 | 9 | 10 | 11 | 12 | 13 | 14 | 15 |
| Plutella maculipennis (diamond back moth, larvae) - contact test | Mustard | 2 | 3 | 3 | 3 | 3 | 2 | 2 | 3 | 3 | 3 | 3 | 0 | 3 | 3 | 3 | |
| Phaedon cochleariae (mustard beetles - residual test) | Mustard | 2 | 3 | 3 | 3 | 0 | 3 | 3 | 3 | 3 | 3 | 3 | 0 | 3 | 3 | 3 | |
| Phaedon cochleariae (mustard beetles - systemic test) | Mustard | 2 | 2 | 0 | 0 | 1 | — | — | 0 | 3 | — | 0 | 0 | — | 0 | 3 | |
| Calendra granaria (grain beetles) | Grain | 2 | 3 | 3 | 3 | 3 | 3 | 3 | 0 | 1 | 3 | 3 | 0 | 3 | 3 | 3 | |
| Tribolium confusum (flour beetles) | Grain | 2 | 3 | 3 | 3 | 3 | 3 | 3 | 2 | 0 | 3 | 3 | 0 | 3 | 3 | 3 | |
| Blattella germanica (cochroaches) | — | 1 | 3 | 3 | 3 | 3 | 3 | 3 | 0 | 3 | — | 3 | 2 | 3 | 2 | 2 | |
| Meloidogyne incognita (nematodes) | Water | 1 | — | — | — | — | — | — | — | — | 3 | — | — | — | — | | |
| Aedes aegypti (mosquito larvae) | Water | 1 | 3 | 3 | 3 | 3 | — | 3 | 0 | 0 | 3 | 3 | 3 | 3 | 3 | 3 | |

In the foregoing Table "contact test" indicates that both the pests and the medium were treated, "residual test" indicates that the medium was treated before infestation with the pests, and "systemic test" indicates that the leaves of the host plant were infested after the roots of the plant had been treated with the composition of the compound under test.

Compounds Nos. 4 and 27 of Table I were also tested for molluscicidal activity, and were found to be very toxic to grey field slugs (*Agriolimax reticulatus*).

EXAMPLE 9

This example illustrates the superior insecticidal properties associated with compounds of the present invention in a comparative test with a compound of the type described in U.K. patent specification, Ser. No. 1,019,227, viz 0,0-dimethyl 0(2-diethylamino-4-methylpyrimidin-6-yl) phosphorothionate.

In a residual test, the persistance of the compounds was investigated using aphids of the species *Macrosiphon pisi* on broad bean plants. In the test three replicates were used for each compound. Potted broad bean plants (height about 20–25 cm.) were sprayed with an aqueous preparation containing 0.025 percent by weight of the compound under test until the preparation was just running off the leaves. One hour later the plants were each infested with about 25–30 adult aphids of the species *Macrosiphon pisi*. The percentage of dead and moribund aphids was determined after 4 hours. The plants were reinfested after 24 hours, and again the percentage dead and moribund aphids assessed after 4 hours. This was repeated at 24 hourly intervals for 4 days.

The results are given in Table 4 below.

TABLE 4

| Compound | % dead and moribund aphids 4 hours after infesting | | | | |
| --- | --- | --- | --- | --- | --- |
| | Days after spraying | | | | |
| | 0 | 1 | 2 | 3 | 4 |
| No.1 (Table 1) | 100 | 100 | 70 | 27 | — |
| No.2 (Table 1) | 100 | 100 | 72 | 50 | 32 |
| No.3 (Table 1) | 100 | 100 | 98 | 55 | 24 |
| No.7 (Table 1) | 100 | 100 | 52 | 31 | — |
| 0,0-dimethyl 0 (2-diethylamino-4-methylpyrimidin-6-yl) phosphorothionate | 100 | 46 | 14 | — | — |
| Control (No compound) | 0 | 0 | 0 | 0 | 0 |

EXAMPLE 10

A further test was conducted using the procedure outlined in Example 9 above wherein more of the compounds of the present invention were compared with 0,0-dimethyl 0(2-diethylamino-4-methyl-pyrimidin-6-yl) phosphorothionate and also with 0,0-diethyl 0(2-diethylamino-4-methylpyrimidin-6-yl) phosphorothionate. The results are given in Table 5 below.

Table 5

| Compound | % dead and moribund aphids 4 hours after infesting | | | | | | |
| --- | --- | --- | --- | --- | --- | --- | --- |
| | Days After Spraying | | | | | | |
| | 0 | 1 | 2 | 3 | 4 | 5 | 6 |
| No.4 (Table 1) | 100 | 100 | 67 | 28 | — | — | — |
| No.5 (Table 1) | 100 | 100 | 100 | 99 | 87 | 67 | — |
| No.6 (Table 1) | 100 | 91 | 32 | — | — | — | — |
| No.8 (Table 1) | 100 | 96 | 43 | — | — | — | — |
| No.12 (Table 1) | 100 | 100 | 100 | 98 | 92 | 67 | — |
| No.13 (Table 1) | 100 | 100 | 100 | 97 | 42 | — | — |
| No.14 (Table 1) | 100 | 100 | 100 | 99 | 78 | 57 | 42 |
| No.15 (Table 1) | 100 | 100 | 100 | 65 | 6 | — | — |
| No.16 (Table 1) | 100 | 100 | 100 | 98 | 64 | 38 | — |
| No.17 (Table 1) | 100 | 100 | 100 | 78 | 10 | — | — |
| No.18 (Table 1) | 100 | 100 | 100 | 99 | 59 | 29 | — |
| No.21 (Table 1) | 100 | 97 | — | — | — | — | — |
| No.22 (Table 1) | 100 | 100 | 95 | 91 | — | — | — |
| No.24 (Table 1) | 100 | 100 | 99 | 63 | 28 | — | — |
| No.25 (Table 1) | 100 | 100 | 98 | — | — | — | — |
| 0,0-dimethyl 0(2-diethylamino-4- | | | | | | | |

Table 5—Continued

| Compound | % dead and moribund aphids 4 hours after infesting | | | | | | |
|---|---|---|---|---|---|---|---|
| | Days After Spraying | | | | | | |
| | 0 | 1 | 2 | 3 | 4 | 5 | 6 |
| methylpyrimidin-6-yl phosphorothionate | 100 | 57 | 4 | — | — | — | — |
| 0,0,-diethyl 0(2-diethylamino-4-methylpyrimidin-6-yl phosphorothionate | 75 | 5 | — | — | — | — | — |
| Control (No. Compound) | 0 | 0 | 0 | 0 | 0 | 0 | 0 |

EXAMPLE 11

The compounds of this invention were tested against a variety of foliar fungal diseases of plants. The technique employed is to spray the foliage of the undiseased plants with a solution of the test compound and also to drench the soil in which the plants are growing with another solution of the same test compound. All solutions for spraying and drenching contained 0.01 percent of the test compound. The plants were then infected with the diseases it was desired to control and after a period of days, depending upon the particular disease, the extent of the disease was visually assessed. The results are given in Table 6A below, wherein the extent of the disease is given in the form of a grading as follows:

| Grading | Percentage Amount of Disease |
|---|---|
| 0 | 61 to 100 |
| 1 | 26 to 60 |
| 2 | 6 to 25 |
| 3 | 0 to 5 |

In Table 6 the disease is given in the first column, and in the second column is given the time which elapsed between infecting the plants and assessing the amount of disease.

TABLE 6

| Disease and Plant | Time interval (days) | Disease Code Letter (Table 6A) |
|---|---|---|
| Phytophthora infestans (tomato) | 3 | A |
| Plasmopara viticola (vine) | 7 | B |
| Uncinula necator (vine) | 10 | C |
| Piricularia oryzae (rice) | 7 | D |
| Podosphaera leucotricha (apple) | 10 | E |

TABLE 6A

| Compound NO: (Table I) | DISEASE CODE LETTER (TABLE 6) | | | | |
|---|---|---|---|---|---|
| | A | B | C | D | E |
| 1 | 0 | 0 | 3 | 0 | 3 |
| 2 | 0 | 0 | 3 | 0 | 3 |
| 3 | 1 | 0 | 3 | 1 | 3 |
| 4 | 0 | 1 | 3 | 1 | 3 |
| 5 | 0 | 2 | 3 | 0 | 3 |
| 6 | 0 | 2 | 3 | 0 | 3 |
| 7 | 0 | 0 | 3 | 0 | 3 |
| 8 | 0 | 2 | 3 | 1 | 3 |
| 9 | 0 | 0 | 3 | 0 | 3 |
| 10 | 0 | 0 | 3 | 0 | 3 |
| 11 | 2 | 3 | 3 | 0 | 2 |
| 12 | 0 | 0 | 3 | 0 | 3 |

TABLE 6A-Continued

| Compound NO: (Table I) | DISEASE CODE LETTER (TABLE 6) | | | | |
|---|---|---|---|---|---|
| | A | B | C | D | E |
| 13 | 1 | 0 | 3 | 0 | 1 |
| 14 | 1 | 0 | 3 | 0 | 3 |
| 15 | 1 | 0 | 3 | 1 | 1 |
| 16 | 0 | 0 | 3 | 1 | 1 |
| 17 | 0 | 0 | 3 | 0 | 3 |
| 18 | 0 | 0 | 3 | 0 | 3 |
| 19 | 3 | 0 | 3 | 0 | 1 |
| 20 | 3 | 2 | 3 | 0 | 2 |
| 21 | 1 | 1 | 3 | 0 | 1 |
| 22 | 0 | 1 | 0 | 0 | 1 |
| 23 | 1 | 3 | 0 | 0 | 3 |
| 24 | 0 | 0 | 3 | 0 | 3 |
| 25 | 1 | 1 | 3 | 1 | 3 |

EXAMPLE 12

This example illustrates a dusting powder which may be applied directly to plants or other surfaces and comprises 1 percent by weight of compound No. 3 of Table I and 99 percent by weight of talc.

EXAMPLE 13

25 Parts by weight of Compound No. 3 of Table I, 65 parts by weight of xylene, and 10 parts of an alkyl aryl polyether alcohol ('Triton' X-100; 'Triton' is a Trade Mark) were mixed in a suitable mixer. There was thus obtained an emulsion concentrate which can be mixed with water to produce an emulsion suitable for use in agricultural applications.

EXAMPLE 14

5 Parts by weight of Compound No. 3 of Table I were thoroughly mixed in a suitable mixer with 95 Parts by weight of talc. There was thus obtained a dusting powder.

EXAMPLE 15

10 Parts by weight of compound No. 3 of Table I, 10 parts of an ethylene oxide-octylphenol condensate ("Lissapol" NX; "Lissapol" is a Trade Mark) and 80 parts by weight of diacetone alcohol were thoroughly mixed. There was thus obtained a concentrate which, in mixing with water, gave an aqueous dispersion suitable for application as a spray in the control of insect pests.

EXAMPLE 16

This example illustrates a concentrated liquid formulation in the form of an emulsion. The ingredients listed below were mixed together in the stated proportions and the whole stirred until the constituents were dispersed.

| | % wt. |
|---|---|
| Compound No. 3 of Table I | 20 |
| 'LUBROL' L('LUBROL' is a Trade Mark) | 17 |
| Calcium dodecylbenzenesulphonate | 3 |
| Ethylene dichloride | 45 |
| 'AROMASOL' H('Aromasol' is a Trade Mark) | 15 |
| | 100% |

EXAMPLE 17

The ingredients listed below were ground together in the proportions stated to produce a powdered mixture readily dispersible in liquids.

| | % wt. |
|---|---|
| Compound No. 2 of Table I | 50 |
| Dispersol T ("Dispersol" is a Trade Mark) | 5 |
| China Clay | 45 |
| | 100% |

EXAMPLE 18

A composition in the form of grains readily dispersible in a liquid (for example water) was prepared by grinding together the first four of the ingredients listed below in the presence of water and then the sodium acetate was mixed in.

The admixture was dried and passed through a British Standard mesh sieve, size 44–100 to obtain the desired size of grains.

| | % wt. |
|---|---|
| Compound No.5 of Table I | 50 |
| Dispersol T | 12.5 |
| Calcium lignosulphonate | 5 |
| Sodium dodecylbenzenesulphonate | 12.5 |
| Sodium acetate | 20 |

EXAMPLE 19

A composition suitable for use as a seed dressing was prepared by mixing all three of the ingredients set out below in the proportions stated.

| | % wt. |
|---|---|
| Compound No.10 of Table I | 80 |
| Mineral Oil | 2 |
| China Clay | 18 |
| | 100% |

EXAMPLE 20

A granular composition was prepared by dissolving the active ingredient in a solvent, spraying the solution obtained on to the granules of pumice and allowing the solvent to evaporate.

| | % wt. |
|---|---|
| Compound No. 15 of Table I | 5 |
| Pumice Granules | 95 |
| | 100% |

EXAMPLE 21

An aqueous dispersion formulation was prepared by mixing and grinding the ingredients recited below in the proportions stated.

| | % wt. |
|---|---|
| Compound No. 27 of Table I | 40 |
| Calcium lignosulphonate | 10 |
| Water | 50 |
| | 100% |

The following constitutes an explanation of the compositions or substances represented by the various Trade Marks and Trade Names referred to in the foregoing Examples.

| | |
|---|---|
| 'LUBROL' L | is a condensate of 1 mole of nonyl phenol with 13 molar proportions of ethylene oxide. |
| 'AROMASOL' H | is a solvent mixture of alkylbenzenes |
| 'DISPERSOL' T | is a mixture of sodium sulphate and a condensate of formaldehyde with the sodium salt of naphthalene sulphonic acid. |
| 'LISSAPOL' NX | is a condensate of 1 mole of nonyl phenol with 8 moles of ethylene oxide. |
| 'TRITON' X-100 | is an alkyl aryl polyether alcohol. |

We claim:
1. Compounds of formula:

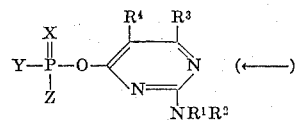

wherein X is oxygen or sulphur, Y and Z, which may be the same or different, are alkoxy containing up to six carbon atoms; $R^3$ and $R^4$, which may be the same or different, are hydrogen or alkyl containing up to six carbon atoms; $R^1$ is alkyl containing up to six carbon atoms; and $R^2$ is a group $R^5.CO-$ where $R^5$ is hydrogen, alkyl containing up to six carbon atoms, alkoxy containing up to six carbon atoms or alkyl-substituted amino containing up to six carbon atoms.

2. Compounds according to claim 1 of formula:

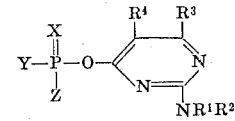

wherein X is oxygen or sulphur; Y and Z, which may be the same or different, are methoxy or ethoxy; $R^3$ and $R^4$, which may be the same or different, are hydrogen or methyl; $R^1$ is alkyl containing up to four carbon atoms; $R^2$ is a group $R^5.CO-$ where $R^5$ is hydrogen, alkyl containing up to three carbon atoms, ethoxy or methylamino.

3. The compound of formula:

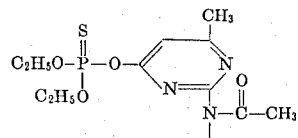

* * * * *